April 4, 1950  A. LEITH  2,502,731
SAFETY DEVICE FOR AUTOMATIC FEED MECHANISMS
Filed Aug. 28, 1947  2 Sheets-Sheet 1
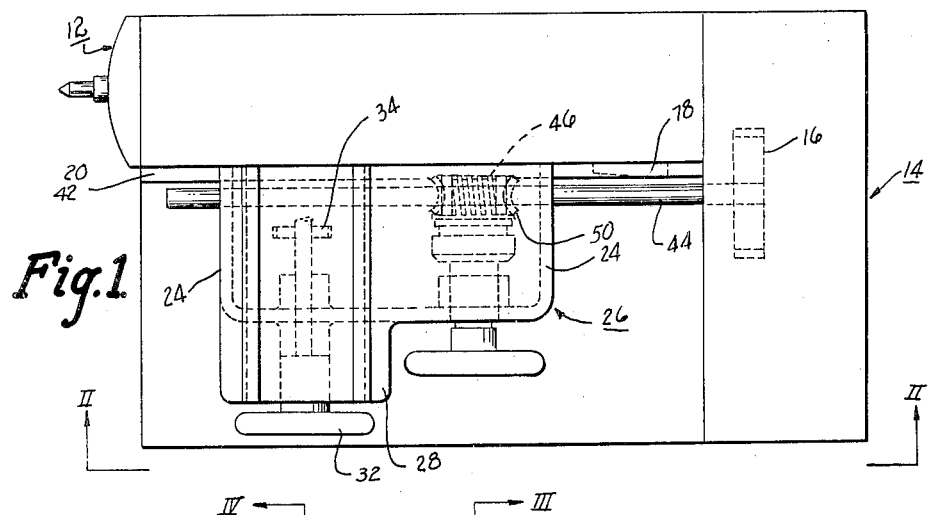
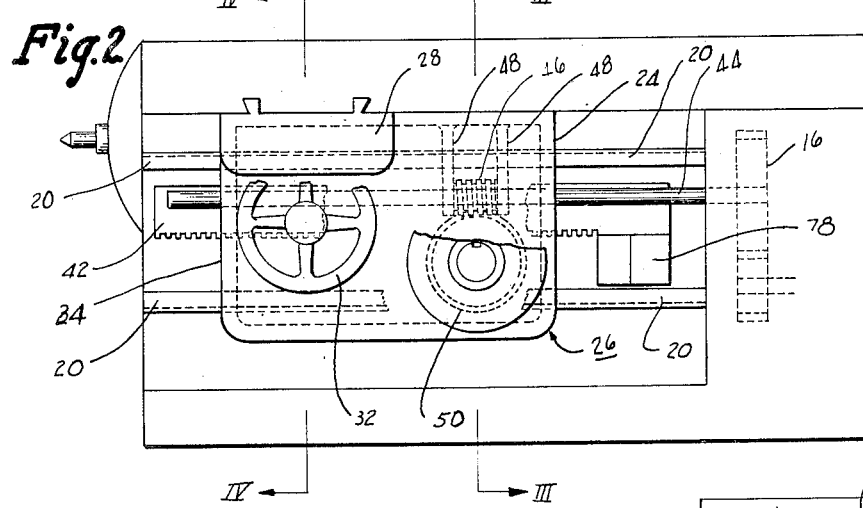
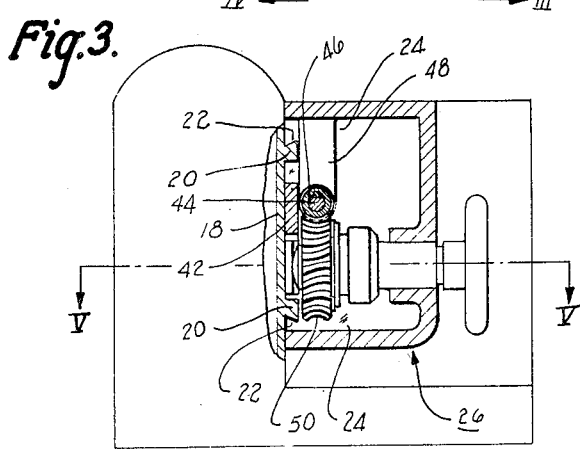
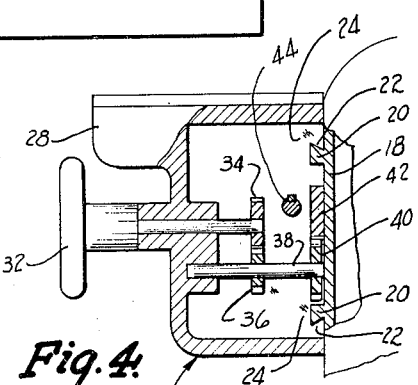
INVENTOR.
Alfred Leith
BY Louis Necho
ATTORNEY April 4, 1950          A. LEITH          2,502,731
SAFETY DEVICE FOR AUTOMATIC FEED MECHANISMS
Filed Aug. 28, 1947          2 Sheets-Sheet 2
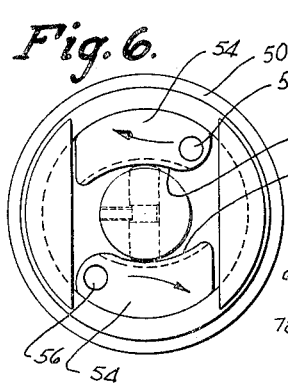
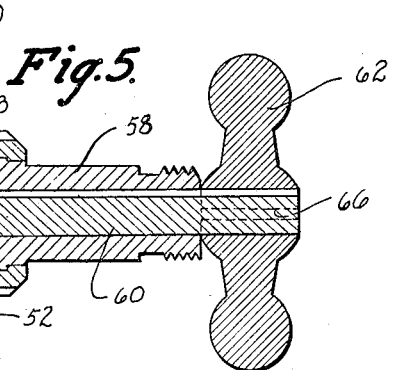
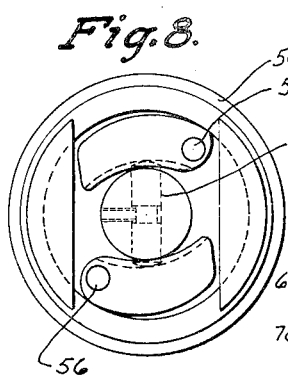
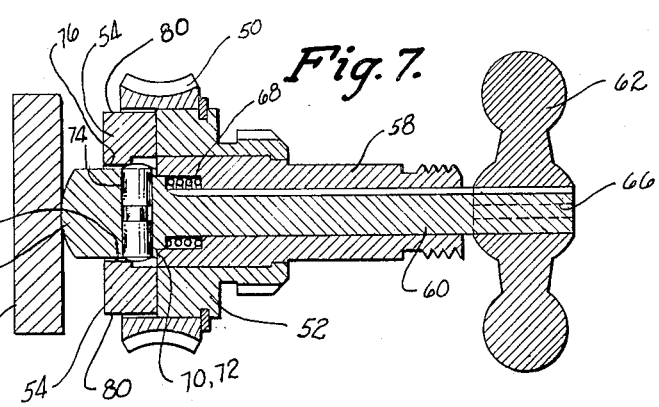
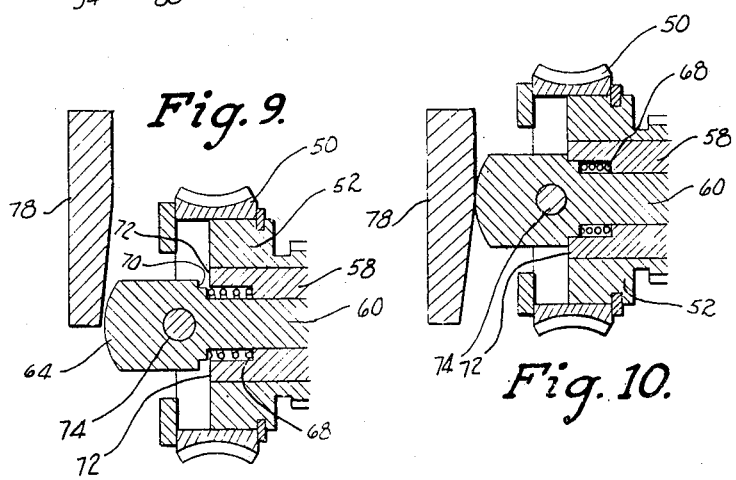
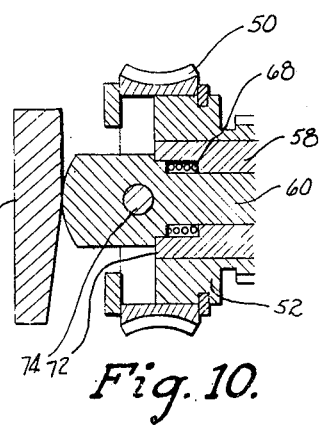
INVENTOR.
Alfred Leith
BY Louis Necho
ATTORNEY Patented Apr. 4, 1950

2,502,731

UNITED STATES PATENT OFFICE 2,502,731

SAFETY DEVICE FOR AUTOMATIC FEED MECHANISMS

Alfred Leith, Wynnewood, Pa.

Application August 28, 1947, Serial No. 771,027

3 Claims. (Cl. 82—21)

In lathes, and similar machine tools, an automatic feed mechanism is provided for moving a carriage which supports a cutting tool relative to a work piece and it is necessary to disengage the automatic feed mechanism, at the end of a cutting stroke, so that it may be reset to begin another cutting stroke. If the operator fails to disengage the automatic feed mechanism at the end of any cutting stroke, considerable damage can result.

It is therefore an object of my invention to provide a safety device which will automatically disengage the automatic feed mechanism at any predetermined point in, or when it has reached the end of, its travel so as to prevent damage due to continued movement of the feed mechanism past its appointed limit.

A further object of the invention is to provide an improved safety device of the type set forth.

A still further object is to produce a simple, durable and inexpensive safety device and one which can be readily incorporated in the machine tool without materially altering the structure of such machine or materially adding to its cost.

These and other objects are attained by my invention as set forth in the following specification and as illustrated in the accompanying drawings in which:

Fig. 1 is a fragmentary and diagrammatic top plan view of a portion of an engine lathe provided with a safety device embodying my invention.

Fig. 2 is a side elevation of the same looking in the direction of line 2—2 in Fig. 1.

Fig. 3 is a vertical section taken on line 3—3 of Fig. 2.

Fig. 4 is a vertical section taken on line 4—4 on Fig. 2.

Fig. 5 is a greatly enlarged sectional view taken on line 5—5 on Fig. 3, (certain parts being omitted) showing the position of the parts before the automatic feed mechanism has been rendered inoperative by the safety device of my invention.

Fig. 6 is a left hand end view of Fig. 5.

Fig. 7 is similar to Fig. 5 but showing the position of the parts after the automatic feed mechanism has been rendered inoperative.

Fig. 8 is a left hand end view of Fig. 7.

Fig. 9 is a horizontal sectional view of the left hand end portion of Fig. 5 taken on a plane normal to the plane on which Fig. 5 is taken, showing the parts in one position thereof, and certain parts being omitted.

Fig. 10 is similar to Fig. 9 but showing the parts in another position thereof.

In the drawings there is shown an engine lathe which includes a head stock 12, a gear box 14 in which there is a train of gears, not shown, for supplying motive power for turning the head stock. On the vertical wall 18 of the lathe housing there are dove tail ribs 20 which form tracks for slidably engaging the correspondingly shaped grooves 22 formed in the end walls 24 of a box like structure 26 which houses some of the parts of the automatic feed mechanism. The box 26 carries a block 28 which is adapted to carry a cutting tool, not shown, whereby, as the box 26 is moved longitudinally, or to the left and right as shown in Figs. 1 and 2, the tool carried by the block 28 will be moved relative to a work piece also not shown, supported on the head stock 12.

The box 26, and the tool carrying block 28 may be moved manually by means of a hand wheel 32 which turns a gear 34 which meshes with a gear 36 on a shaft 38. The shaft 38 also carries a pinion 40 which engages a rack 42 carried by or formed on the side wall 18 of the lathe housing. Therefore, by turning the hand wheel 32, in either direction, the box 26, and the cutting tool carried by the block 28, will be moved in one direction or the other. This manual feed mechanism is used for adjustment or resetting of the feed mechanism.

For automatically moving the cutting tool relative to a work piece, there is provided a shaft 44 which extends from the gear box 14 and which is driven by the gears or the like 45. On the shaft 44 there is slidably keyed a worm 46. The worm is confined between two pendant arms 48 which are carried by the top wall of the box 26 and it engages a ring gear 50 the structure and location of which are best seen in Figs. 1 and 5.

The ring gear 50 is internally engaged, partly by a mounting block 52 and partly by the periphery of one or more movable shoes 54. In practice, I provide a pair of oppositely disposed shoes which are pivoted at 56 to the mounting block 51 so as to be moveable, towards or away from each other, about the axes of their respective pivots as shown by the arrows in Fig. 6. The ring gear 50 only loosely engages the mounting block 52 so that the ring gear always rotates freely relative to the mounting block.

The mounting block 52 is carried by a sleeve 58 through which extends a shaft 60. The outer end of the shaft 60 is provided with a hand wheel 62 and the inner end of the shaft has an enlarged, outwardly rounded head 64. The shaft 60 is suitably keyed, as at 66, to the sleeve 58 so that when the wheel 62 is turned, the sleeve 58 rotates with the shaft 60. As will be best seen from Figs. 7 and 8 the sleeve 58 is provided with an inner recess 67 for accommodating a spring 68 which urges the shaft 60 to the left as viewed in Figs. 5 and 7. The head 64 is provided with a shoulder 70 which is adapted to abut the inner end 72 of the sleeve 58 so as to limit movement of the shaft 60 in the reverse direction or to the right as viewed in Fig. 5.

The head 64 carries a cross pin 74 the rounded ends of which, in the position of the device as shown in Fig. 5, engage the inner juxtaposed curved faces 76 of the shoes 54, to spread the shoes apart.

In the position shown in Fig. 7, the ends of the pin, or at least the high portions thereof, are out of engagement with the faces 76 of the shoes 54 thus permitting the shoes to move toward each other. It is therefore evident that when the pin 74 is in the position of Fig. 5, the shoes 54 are expanded or moved apart so that their outer surfaces 80 will frictionally engage the corresponding portions of the inner surface of the ring gear 5 and will thus integrate the ring gear with the shaft 60. It is also evident that, when the pin 74 is in the position of Fig 7, the shoes 54 are no longer in engagement with the ring gear 50 and since this ring gear is mounted for free rotation with respect to the mounting block 52, the ring gear may be rotated by the sleeve 58 or the worm 46 without causing the shaft 60 to rotate.

If it is desired momentarily to disengage the pin 74 from the shoes 54, the shaft 60 may be pulled, by the hand wheel 62, to the right as shown in Fig. 7 so as to move the pin 74 from the position of Fig. 5 to the position of Fig. 7. When, however, the handwheel 62 is released, the spring 68 will automatically urge the shaft 60 back to the position of Fig. 5, in which the pin 74 engages the shoes 54. To disengage the pin 74 permanently from the shoes 54, the hand wheel 62 is turned so as to rotate the shaft 60 and the pin 74 through an angle of 180° so as to take the pin 74 out of registration with the shoes. The manual disengagement of the pin 74 from the shoes 54 permits manual resetting of the feed mechanism.

It is apparent that, when the feed mechanism is running automatically, the box 26 will unless, the automatic feed mechanism is disengaged, continue to move towards, and will run into, the gear box 14. It is therefore necessary for the operator manually to disengage the pin 74 from the shoes at the end of each stroke or cutting operation.

In order to prevent damage to the machine which will result if the operator should fail to render the automatic feed mechanism inoperative when the feed mechanism has reached its appointed limit, I provide a cam plate 78 which is adapted to engage the rounded end of the head 64 so as to move the shaft 60 and the pin 74, to the right, as viewed in Fig. 5, or from the shoe engaging position of Fig. 5 to the non-engaging position of Fig. 7.

The cam plate is secured to the vertical wall 18 of the lathe housing so as to be in the path of the head 64 and is so located, relative to the range of movement of the box 26 as to disengage the pin 74 from the shoes 54 at the end of the stroke or at any desired point in advance thereof. As best shown in Figs. 9 and 10, the cam plate 78 tapers to the left as viewed in the drawing, so as to facilitate the movement of the head 64 thereover.

When the automatic feed mechanism release of my invention is to be used, the operator sets the cam 78 in the desired position in the path of movement of the shaft 60 longitudinally of the lathe housing so that the head 64 of the shaft 60 will ride upon the high portion of the cam plate 78 and will thus push the pin 74 to the right, or out of contact with the shoes 54. When this takes place, the shoes 54, being out of frictional engagement with the ring gear, the latter will turn freely with respect to the block 52 and the movement of the feed mechanism longitudinally of the lathe housing will be arrested, thus preventing damage. The operator, by using the hand wheel 62 can reset the feed mechanism and, as soon as the head 64 rides off the high position of the cam plate 78 the spring 68 again moves the pin 74 into engagement with the shoes 54.

Having described my invention, what I claim is:

1. An automatic feed mechanism for a machine tool, or the like, said mechanism including a driven worm, a support mounted for movement relative to said worm, a shaft carried by said support, a ring gear carried by said shaft and meshing with said worm, said gear being freely rotatable on said shaft, a shoe pivotably mounted adjacent said gear, a pin movable to a first position in which it engages said shoe and forces it into frictional engagement with the inner circumferential periphery of said gear to lock said gear to said shaft, said pin being movable to a second position in which it is out of engagement with said shoe, and a cam disposed in the path of movement of said support for moving said pin to said second position.

2. A safety attachment for automatically stopping the feed mechanism of a machine tool or the like, which feed mechanism includes a driven worm and a carriage mounted for movement by said worm relative to said machine tool, said attachment including a shaft carried by said carriage, a ring gear carried by said shaft and meshing with said worm, said gear being freely rotatable on said shaft, a shoe pivotally mounted adjacent said gear, a pin movable to a first position in which it engages said shoe and forces it into frictional engagement with the inner circumferential periphery of said gear to lock said gear to said shaft, said pin being movable to a second position in which it is out of engagement with said shoe, and a cam disposed in the path of movement of said carriage and adapted to engage and move said pin to said second position.

3. The structure recited in claim 2 in which said shaft is hollow and is disposed normal to the direction of movement of the carriage, in which at least a portion of the periphery of the shoe is at all times inside of the ring gear, and in which the pin actuating the shoe is carried by a rod passing through and movable longitudinally of said shaft.

ALFRED LEITH.

REFERENCES CITED

The following references are of record in the file of this patent:

UNITED STATES PATENTS

| Number | Name | Date |
|---|---|---|
| 590,736 | Earle | Sept. 28, 1897 |
| 1,880,843 | Curtis | Oct. 4, 1932 |
| 2,154,915 | Ohera | Apr. 18, 1939 |